US011198346B2

(12) United States Patent
Blatchley et al.

(10) Patent No.: US 11,198,346 B2
(45) Date of Patent: Dec. 14, 2021

(54) VEHICLE VAPOR-INJECTION HEAT PUMP SYSTEM WITH CONTROLLABLE EVAPORATOR VALVE

(71) Applicant: FORD GLOBAL TECHNOLOGIES, LLC, Dearborn, MI (US)

(72) Inventors: Timothy Noah Blatchley, Dearborn, MI (US); Loren John Lohmeyer, Monroe, MI (US); Angelo Patti, Pleasant Ridge, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 343 days.

(21) Appl. No.: 16/353,740

(22) Filed: Mar. 14, 2019

(65) Prior Publication Data
US 2020/0290429 A1 Sep. 17, 2020

(51) Int. Cl.
*B60H 1/00* (2006.01)
*B60H 1/22* (2006.01)

(52) U.S. Cl.
CPC ..... *B60H 1/00899* (2013.01); *B60H 1/00278* (2013.01); *B60H 1/2218* (2013.01); *B60H 1/2225* (2013.01); *B60H 2001/00307* (2013.01); *B60H 2001/00928* (2013.01)

(58) Field of Classification Search
CPC ............ B60H 1/00899; B60H 1/00278; B60H 1/2225; B60H 2001/00928; B60H 2001/00307; B60H 2001/3252; B60H 1/3213; B60H 1/004; B60H 1/00735; B60H 1/00878; B60L 58/26; B60L 58/27
See application file for complete search history.

(56) References Cited

U.S. PATENT DOCUMENTS

| | | | |
|---|---|---|---|
| 9,696,070 B2 | 7/2017 | Ohta | |
| 10,457,111 B2* | 10/2019 | Gebbie | ............. B60H 1/00921 |
| 2015/0102118 A1 | 4/2015 | Hirabayashi et al. | |
| 2016/0303946 A1* | 10/2016 | Miller | ................... B60W 10/02 |
| 2016/0344075 A1* | 11/2016 | Blatchley | .............. B60W 20/15 |
| 2017/0240024 A1* | 8/2017 | Blatchley | ........... B60H 1/00007 |
| 2019/0061471 A1* | 2/2019 | Hotzel | ............... B60H 1/32281 |

\* cited by examiner

*Primary Examiner* — Frantz F Jules
*Assistant Examiner* — Lionel Nouketcha
(74) *Attorney, Agent, or Firm* — Brooks Kushman PC; David Kelley

(57) ABSTRACT

A vehicle includes a vapor-injection heat pump having a refrigerant loop with an evaporator configured to cool cabin air, the evaporator coupled to an electronically controllable pressure regulating valve having a fully-open position with near-zero pressure drop, and a cabin conditioning coolant loop having a heater core configured to selectively heat the cabin air. A controller is configured to control the valve to maintain temperature and pressure of the refrigerant loop above a freezing threshold to inhibit or prevent evaporator icing. The valve may be controlled to throttle flow during a parallel dehumidification mode and to fully open to minimize pressure drop during other operational modes, such as a cooling mode, heating mode, de-icing mode, and series dehumidification mode.

6 Claims, 3 Drawing Sheets

VEHICLE VAPOR-INJECTION HEAT PUMP SYSTEM WITH CONTROLLABLE EVAPORATOR VALVE

TECHNICAL FIELD

The present disclosure relates to a vapor-injection heat pump system having a controllable valve at the outlet of an evaporator that provides cabin cooling.

BACKGROUND

Current heat pump designs may use an evaporator pressure regulator (EPR) to enable certain operating modes, such as parallel dehumidification, to prevent the vehicle cabin evaporator(s) from icing. The additional operating modes enabled by use of an EPR may provide greater system operating efficiency during a wider range of operating conditions. However, the EPR may reduce efficiency and capacity of the heat pump in other operating modes, such as a cooling mode or serial dehumidification mode, for example.

SUMMARY

One or more embodiments include a vehicle having a vapor injection heat pump system including a refrigerant loop having at least one evaporator positioned to selectively cool cabin air. The evaporator has an outlet coupled to a valve communicating with a controller to regulate a valve opening responsive to at least one of suction pressure relative to an associated pressure threshold and evaporator fin temperature relative to an associated temperature threshold to inhibit evaporator icing during at least a first operating mode, such as a parallel dehumidification mode, and to fully open the valve during at least a second operating mode, such as a heating or cooling mode, to allow flow therethrough with near zero pressure drop. In at least one embodiment, the controllable valve comprises an electric or electronic evaporator pressure regulator valve. Embodiments may also include a controllable valve comprising an electronic or electric expansion valve, or any multi-position refrigerant valve capable of throttling refrigerant flow in response to a corresponding control signal that controls the opening in response to signals from one or more sensors, and allowing flow therethrough with near zero pressure drop when fully open.

In one embodiment, a vehicle has a vapor-injection heat pump including a refrigerant loop having an evaporator configured to cool cabin air, the evaporator coupled to an electronically controllable pressure regulating valve having a fully-open position with near-zero pressure drop, and a cabin conditioning coolant loop having a heater core configured to selectively heat the cabin air. A controller is configured to control the valve to maintain temperature and pressure of the refrigerant loop above a freezing threshold to inhibit or prevent evaporator icing.

Embodiments include a vehicle having a refrigerant loop including an electrically operable compressor coupled to a cabin conditioning heat exchanger, an electronically controlled expansion valve, an external air heat exchanger and an evaporator configured to cool cabin air, wherein the evaporator is coupled to an electronically controlled evaporator pressure regulator positioned between the evaporator and the compressor. A cabin conditioning loop includes the cabin conditioning heat exchanger, an electrically operated coolant heater, and a heater core configured to heat the cabin air. A battery conditioning loop is selectively fluidly coupled to the cabin conditioning loop via a fluid control valve, and coupled to the refrigerant loop by a battery heat exchanger. A controller is configured to operate the electrically operated heater to heat the cabin air simultaneously with the compressor to cool the cabin air to provide a parallel dehumidification mode, and to control the electronically controlled evaporator pressure regulator to throttle refrigerant flow only during the parallel dehumidification mode.

A method for controlling a vehicle having a heat pump including a refrigerant loop having a compressor coupled via an evaporator pressure regulator to an evaporator configured to selectively provide cabin cooling, and a cabin conditioning coolant loop having a heat exchanger configured to exchange heat with the refrigerant loop, an electric heater configured to heat coolant in a cabin conditioning loop supplied to a heater core configured to selectively provide cabin heating includes, by a controller, controlling the evaporator pressure regulator to throttle an opening when operating the compressor simultaneously with the electric heater in a dehumidification mode. The method also includes controlling the evaporator pressure regulator to fully open when not operating in the dehumidification mode, with the fully open position providing a near-zero pressure drop across the evaporator pressure regulator.

Embodiments of a vehicle heat pump system as described herein may provide one or more advantages. For example, incorporating an electronically controllable or smart evaporation pressure regulator having near zero pressure drop when fully open enables operation of the climate control system in a parallel dehumidification mode while allowing higher efficiency and thermal capacity in all other operating modes by not restricting the refrigerant system suction pressure. The control of the EPR according, to embodiments of the disclosure facilitates throttling of the refrigerant flow during some conditions or modes while allowing flow with near zero pressure drop during other operating conditions or modes to keep the refrigerant pressure and temperature above the freezing threshold to inhibit or prevent the cabin evaporator from icing

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
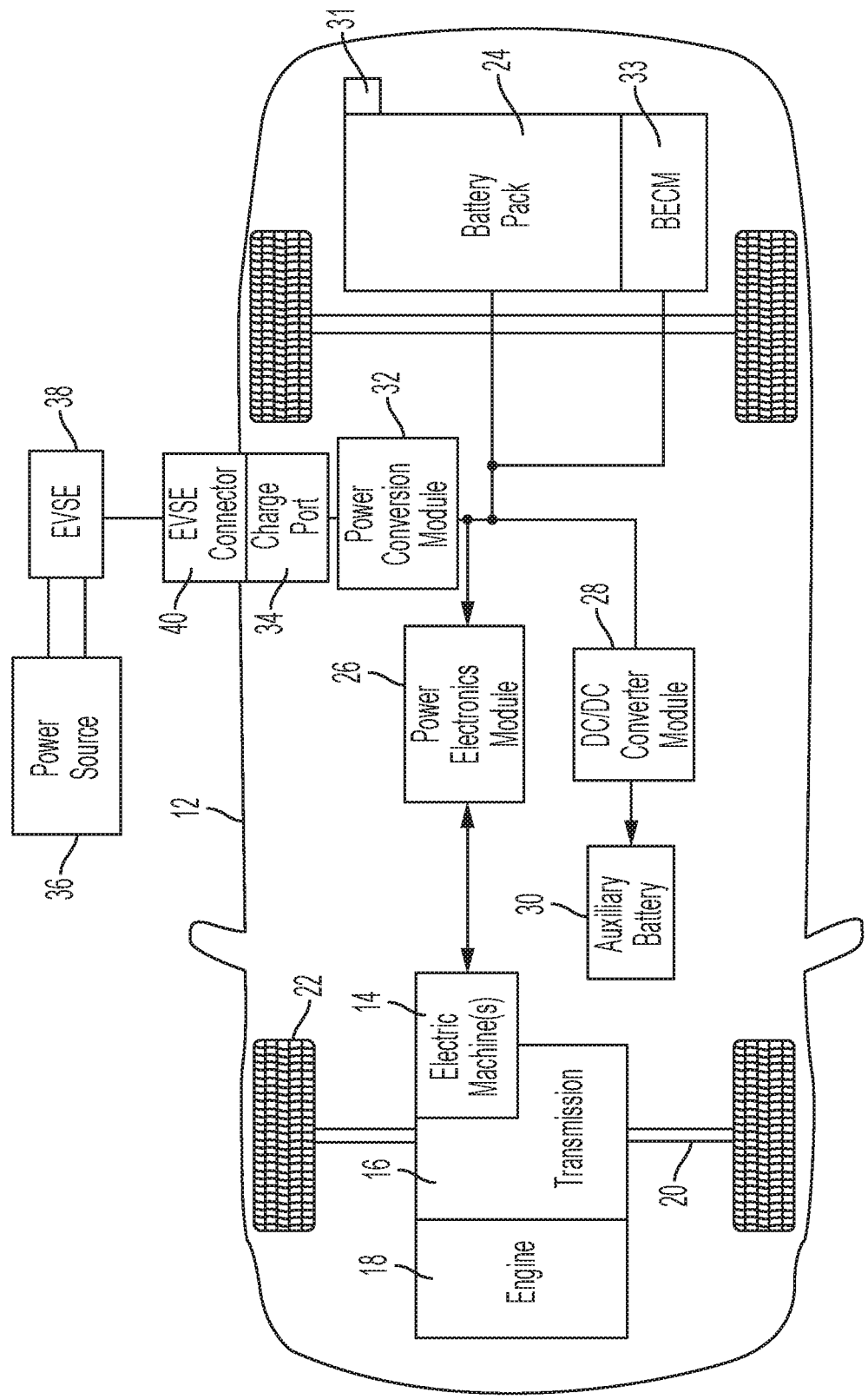
FIG. 1 is a schematic diagram of a representative vehicle having a vapor injection heat pump system with a controllable evaporator valve.

FIG. 1 depicts a schematic of a typical plug-in hybrid-electric vehicle (PHEV) including a vapor injection heat pump system with an electronically controllable evaporator valve according to the present disclosure. Certain embodiments, however, may also be implemented within the context of non-plug-in hybrids and fully-electric vehicles. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy through regenerative braking. The electric machines 14 reduce pollutant emissions and increase fuel economy by reducing the work load of the engine 18.

A traction battery or battery pack 24 stores energy that can be used by the electric machines 14. The traction battery 24 typically provides a high-voltage direct current (DC) output from one or more battery cell arrays, sometimes referred to as battery cell stacks, within the traction battery 24. The battery cell arrays may include one or more battery cells.

The battery cells, such as a prismatic, pouch, cylindrical, or any other type of cell, convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle.

Figure 2:
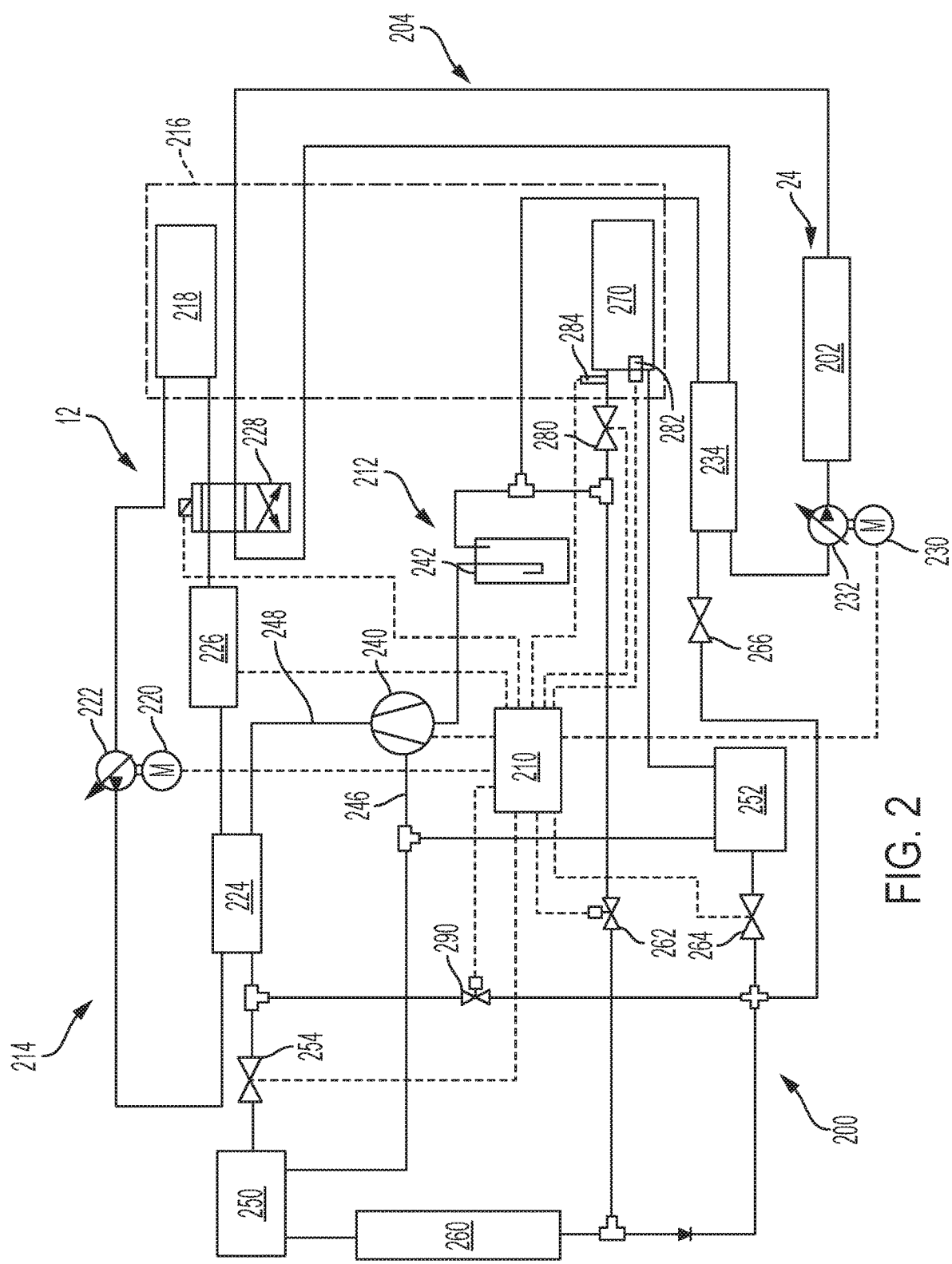
FIG. 2 is a schematic diagram of a battery thermal-management system and a climate-control system of a vehicle.

Different battery pack configurations and chemistries may be available to address individual vehicle variables including packaging constraints and power requirements. The battery cells may be thermally regulated with a thermal management system. Examples of thermal management systems include air cooling systems, liquid cooling systems and a combination of air and liquid systems. A representative thermal management system is illustrated in the schematic of FIG. 2.

As shown in FIG. 1, the traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power-electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a fully-electric vehicle. In a fully-electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle components. Other high-voltage loads, such as compressors and electric heaters, may be connected directly to the high-voltage supply without the use of a DC/DC converter module 28. In a typical vehicle, the low-voltage systems are electrically connected to an auxiliary battery 30 (e.g., a 12V, 24V, or 48V battery).

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature sensor. The temperature sensor 31 may be in communication with the BECM 33 to provide temperature data regarding the traction battery 24.

The vehicle 12 may be recharged by a charging station connected to an external power source 36. The external power source 36 may be electrically connected to electric vehicle supply equipment (EVSE) 38. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more controllers to control and monitor the operation of the components. The controllers may communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or look up tables that are based on calculations and test data, and are stored within the memory. The controller may communicate with other vehicle systems and controllers over one or more wired or wireless vehicle connections using common bus protocols (e.g., CAN and LIN). As used herein, a reference to "a controller" refers to one or more controllers, each of which may include one or more processors and associated persistent, non-transitory memory that maintains its contents without power as well as volatile non-transitory memory that loses its contents without power.

The traction battery 24 and other vehicle component are thermally regulated with one or more thermal management systems. A representative example of a thermal management system including a vapor injection heat pump system is shown and described with reference to FIG. 2.

Referring to FIG. 2, a vehicle 12 includes a thermal management system 200 including a vapor injection heat pump system. The thermal management system 200 can be employed to manage thermal loads generated by various vehicle components, such as the battery assembly 24 that includes an associated battery cold plate 202, powertrain components, and power electronic components. For example, the thermal management system 200 can selectively circulate coolant through a battery conditioning glycol loop or fluid circuit 204 to the battery assembly 24 to either cool or heat the battery assembly depending on operating conditions.

The thermal management system 200 may include one or more vehicle controllers 210. While schematically shown as a single module in the illustrated embodiment, the controller 210 may be part of a larger control system and may communicate with various other controllers throughout the vehicle, such as a vehicle system controller (VSC) that includes a powertrain control unit, a transmission control unit, an engine control unit, a battery electronic control module (BECM) or battery system controller (BSC), etc. It should be understood that the controller 210 and one or more other controllers can collectively be referred to as "a controller" or processor that controls, such as through a plurality of algorithms, various actuators in response to signals from various sensors to control functions associated with the vehicle, and in this case, with the vapor injection heat pump system of the thermal management system 200. The various controllers that make up the VSC can communicate with one another using any of a number of standard or proprietary protocols, such as the controller area network (CAN) protocol, for example.

In one embodiment, the battery thermal management system 200 includes a refrigerant loop or fluid circuit 212, and a cabin conditioning glycol loop or fluid circuit 214. The battery conditioning loop 204, refrigerant loop 212, and cabin conditioning loop 214 may operate in a coordinated manner or independently of one another depending upon the cabin conditioning, battery conditioning, and engine (when provided) cooling requirements, the ambient-air temperature, and other factors. The refrigerant loop subsystem 212 may be a vapor injection heat pump system that circulates a refrigerant transferring thermal energy to various components of the vehicle cabin climate control system. The refrigerant subsystem 212 may provide air-conditioning (AC) for the vehicle cabin, generally indicated by reference numeral 216. Utilizing the cabin AC may be more cost effective than having a dedicated refrigerant system for the traction battery 24. The battery conditioning loop 204 circulates coolant to the battery assembly 24. The cabin conditioning loop 214 circulates coolant through a heater core 218 to heat the cabin. The coolant may be a conventional type of coolant mixture, such as water mixed with ethylene glycol. Other coolants could also be used depending on the particular application and implementation. Refrigerant loop 212 circulates a compressible refrigerant, such as R-134a, carbon dioxide, or HFO-1234yf, for example.

Cabin conditioning loop 214, which functions as part of the vehicle climate control system to provide heat to cabin 216 via heater core 218, includes a motor 220 and pump 222 controlled by controller 210 to selectively circulate coolant through the various components of the cabin conditioning loop 214. In the representative embodiment illustrated in FIG. 2, cabin conditioning loop includes a coolant-to-refrigerant heat exchanger (MX) 224 that exchanges heat or thermal energy from the cabin conditioning loop 214 with the refrigerant loop 212. An electric heater 226 may be powered by the high voltage battery 24 and controlled by controller 210. In one embodiment, heater 226 is a positive temperature coefficient (PTC) heater that is controlled by controller 210 to selectively heat the coolant within cabin conditioning loop 214. A battery heating control valve 228 may be selectively operated by controller 210 to fluidly couple cabin conditioning loop 214 and battery conditioning loop 204 to heat battery 24. In the position illustrated in FIG. 2, valve 228 separates or isolates coolant within cabin conditioning loop 214 from coolant within battery conditioning loop 204.

As also shown in the schematic of FIG. 2, battery conditioning loop 204 includes a motor 230 and associated pump 232 controlled by controller 210 to selectively circulate coolant through battery conditioning loop 204. A refrigerant-to-coolant heat exchanger 234 provides thermal energy or heat transfer between battery conditioning loop 204 and refrigerant loop 212 to selectively cool the battery 24 via battery cold plate 202.

Refrigerant loop 212 includes a compressor 240 controlled by controller 210 and that receives low pressure and temperature refrigerant from a dual-function accumulator/separator 242. Compressor 240 includes a mid-temperature, mid-pressure outlet 246 and a high-temperature, high-pressure outlet 248. Outlet 246 is coupled to a first cyclone separator 250 and a second cyclone separator 252. Outlet 248 is coupled to refrigerant-to-coolant heat exchanger 224, and then to first cyclone separator 250 through an electronic expansion valve (EXV) 254 controlled by controller 210. First cyclone separator 250 is coupled to an outside-air heat exchanger 260, which is coupled to accumulator/separator 242 via a shutoff valve (SOV) 262 controlled by controller 210, to second cyclone separator 252 via an electronically controllable expansion valve 264 controlled by controller 210, and to refrigerant-to-coolant heat exchanger 234 via a thermostatic thermal expansion valve (TXV) (with shutoff functionality) 266.

A heat exchanger or evaporator 270 selectively provides cooling to the vehicle cabin 216 and has an inlet connected to second cyclone separator 252 and an outlet coupled to accumulator/separator 242 via an electronically controllable evaporator pressure regulator (EPR) valve 280 controlled by controller 210. Electronically controllable EPR valve 280 may include a fully open position with near zero pressure drop in addition to controllable positions to provide variable throttling of flow therethrough. Those of ordinary skill in the art will recognize that the actual pressure drop will vary based on the particular application and implementation. In general, the pressure drop will vary based on the port size when in the fully-open position and the pressure on the high-pressure side of the valve. In one embodiment, a near-zero pressure drop corresponds to a pressure drop of less than about 7 kpa or 1 psi. The near-zero pressure drop may also be specified as a ratio or fraction of the nominal system pressure. For example, in one embodiment, a near-zero pressure drop valve has a pressure drop of less than 2% of nominal operating pressure with the valve fully open.

Electronically controllable EPR valve 280 may be controlled during a parallel dehumidification mode to inhibit or prevent freezing of fins of evaporator 270 as described in greater detail with reference to FIG. 3. Evaporator 270 may have an associated temperature sensor 282 to provide a temperature of the associated fins, as well as an associated pressure sensor 284 to measure pressure at the outlet. Temperature sensor 282 and pressure sensor 284 may be connected to controller 210 to provide associated data for use by controller 210 in controlling the thermal management system 200, which may operate in a variety of modes or functions, such as heating mode, cooling mode, parallel dehumidification mode, and series dehumidification mode.

In heating mode, the compressor 240 pressurizes the refrigerant into a hot vapor that is circulated to heat exchanger 224. The thermal energy from the refrigerant is transferred into the coolant circulating through the coolant side of the heat exchanger 224 to heat the coolant in the coolant loop 214. Additional heat may be provided by electric PTC heater 226. The pump 222 operated by motor 220 circulates the heated coolant to the heater core 218 to warm the cabin 216. Depending on the position of valve 228, the heated coolant may also be circulated through battery conditioning loop 204 to warm the battery 24. The heat exchanger 224 acts as a condenser causing the refrigerant to condense into a liquid. Next, the refrigerant passes through expansion device 254, which is in a throttled position in the heating mode. The expansion device 254 reduces the pressure of the refrigerant and lowers the temperature of the refrigerant prior to entering the exterior or outside air heat exchanger 260 after passing through cyclone separator 250. The controller 210 may throttle the expansion device 254 to ensure that the temperature of the refrigerant is below the outside air temperature to facilitate evaporation of the refrigerant within heat exchanger 260. The return path to compressor 240 of refrigerant exiting heat exchanger 260 may be controlled by shutoff valve 262, shutoff valve 290, and expansion valve 264.

When operating in a cooling mode, battery conditioning loop 204 and cabin conditioning loop 214 may be either ON or OFF depending upon operating conditions of the traction battery 24. The compressor 240 pressurizes the refrigerant into a hot vapor that is circulated through heat exchanger 224 to the expansion device 254, which may be in a fully open position in this mode of operation. Heat exchanger 260 acts as a condenser and heat is transferred from the refrigerant to the outside air causing the refrigerant to condense into a substantially liquid state. Shutoff valve 262 is closed and expansion valve 264 is open or throttled so that refrigerant exiting heat exchanger 260 travels through cyclone separator 252 to evaporator 270. Smart EPR 280 is fully open so that refrigerant exiting evaporator 270 experiences near zero pressure drop and is returned to compressor 240 through accumulator/separator 242. The cabin heat exchanger or evaporator 270 extracts heat from air being circulated within the housing to cool the cabin 216. The refrigerant exits evaporator 270 as a vapor and is circulated through the accumulator 242 and back to the compressor 240. Smart EPR may also be throttled depending upon temperature of cooling fins as detected by temperature sensor 282 or to regulate refrigerant pressure as detected by pressure sensor 284 to inhibit or prevent evaporator icing. Dual function valve 266 may be operated to allow flow of some refrigerant through heat exchanger 234 to provide cooling to battery conditioning loop 204.

System 200 may be operated in at least one dehumidification mode where the heater core 218 and interior heat exchanger or evaporator 270 are operated simultaneously. The cabin conditioning loop 214 is activated during dehumidification mode to provide heated coolant to the heater core 218 as previously described with respect to the heating mode. In dehumidification mode, air within the ventilation system is first blown across evaporator 270 causing the air to cool and dehumidify, and is then blown across the heater core 218 to reheat the air prior to being circulated into the passenger seating area. System 200 may have more than one dehumidification mode such as a parallel dehumidification mode and a series dehumidification mode, for example. A de-icing mode may also be provided.

In parallel dehumidification mode, the compressor 240 pressurizes the refrigerant into a high temperature and pressure vapor that is circulated to heat exchanger 224. The thermal energy from the refrigerant is transferred into the coolant circulating through the cabin conditioning loop 214 to heat the coolant. Electric PTC heater 226 may also be operated to provide additional heat to the coolant. Pump 222 and associated motor 220 operate to circulate the heated coolant to the heater core 218 to warm the cabin 216. After passing through heat exchanger 224, a first portion of the high temperature and pressure refrigerant travels through expansion valve 254 and cyclone separator 250, which reduces the pressure and temperature so that low pressure, low temperature refrigerant passes through heat exchanger 260. Shutoff valve 290 is opened so that a second portion of high temperature and high pressure refrigerant passes through expansion valve 264, which provides mild expansion to lower the temperature and pressure to a mid-level, two-phase mixture. Cyclone separator 252 allows some of the vapor to return to the compressor 240, and includes a second expansion valve that further lowers the temperature and pressure of the two-phase mixture that exits the separator 252 and travels to evaporator 270, which cools the cabin air to remove moisture. The smart evaporator pressure regulator valve 280 is controlled by controller based on the refrigerant pressure as determined by pressure sensor 284 and/or evaporator fin temperature as determined by temperature sensor 282 to inhibit or prevent evaporator icing. The low pressure and temperature refrigerant exiting valve 280 is combined with low pressure and temperature two-phase mixture from heat exchanger 260 before passing through separator accumulator 242 and being returned to compressor 240.

System 200 may also operate in a series dehumidification mode in series dehumidification mode, the compressor 240 pressurizes the refrigerant into a hot vapor that is circulated to heat exchanger 224. The thermal energy from the refrigerant is transferred into the coolant circulating through cabin conditioning loop 214 to heat the coolant. The motor 220 and pump 222 circulate the heated coolant to the heater core 218 to warm the cabin 216. The heat exchanger 224 acts as a condenser and causes the refrigerant to condense into a liquid. Next, the refrigerant passes through the first expansion device 254, which is in a throttled position, and to the exterior air heat exchanger 260. In series dehumidification mode, the valve 290 is closed routing all of the refrigerant through heat exchanger 260. The refrigerant exits heat exchanger 260 in a mixed liquid/vapor phase. Valve 262 is also closed and all of the refrigerant is routed to valve 264, cyclone separator 252, and into evaporator 270 to dehumidify the cabin air. Smart EPR valve 280 is operated in a fully open position providing near zero pressure drop and refrigerant exiting the evaporator 270 is routed hack to the compressor 240.

Figure 3:
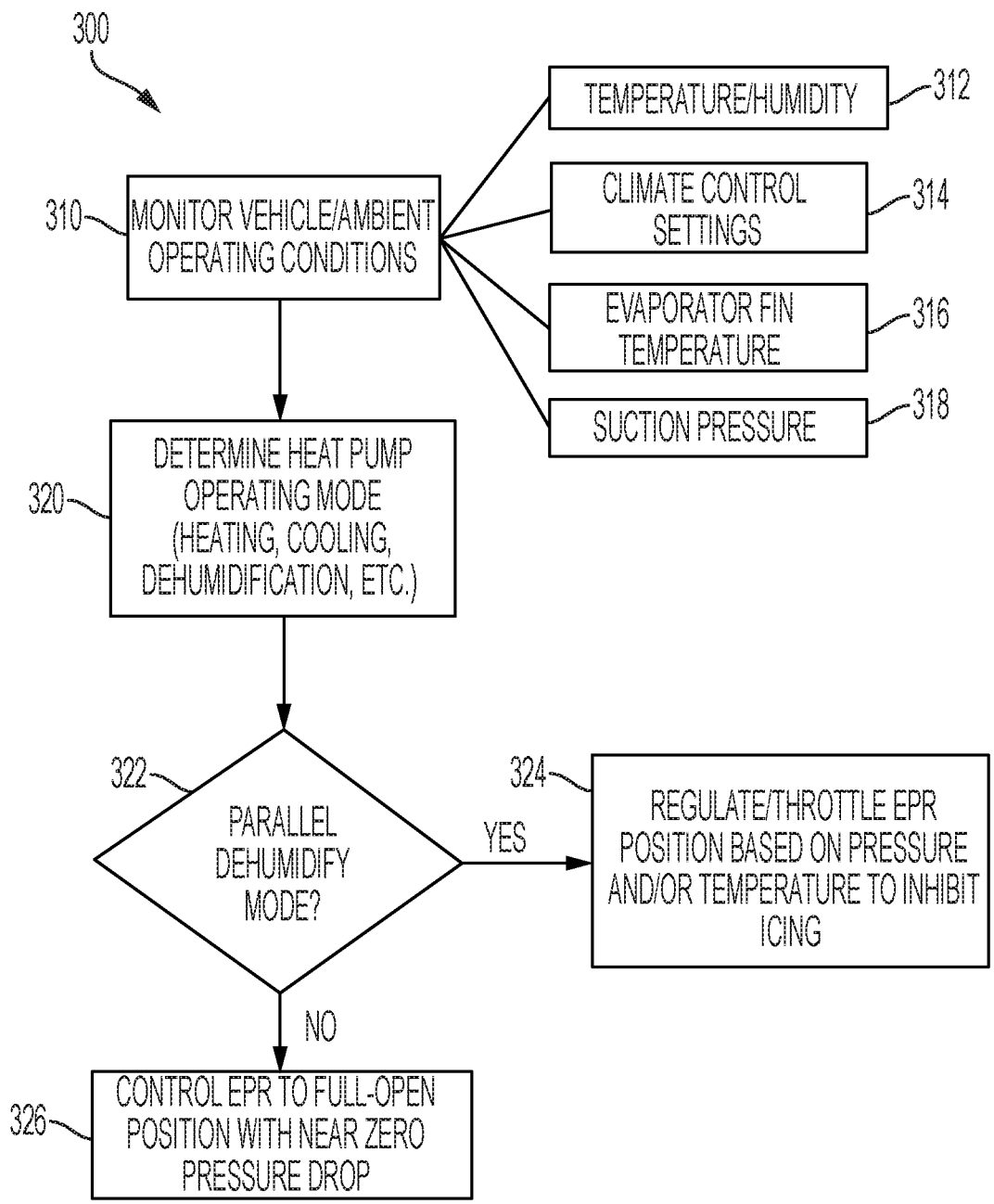
FIG. 3 is a flow chart illustrating operation of a vehicle system or method for controlling an evaporator valve in a vapor injection heat pump system.

Referring to FIG. 1-3 a method for controlling a vehicle is provided. The method may be implemented by a controller or processor controlling a vehicle having a heat pump including a refrigerant loop having a compressor coupled via an evaporator pressure regulator to an evaporator configured to selectively provide cabin cooling, and a cabin conditioning coolant loop having a heat exchanger configured to exchange heat with the refrigerant loop, an electric heater configured to heat coolant in a cabin conditioning loop supplied to a heater core configured to selectively provide cabin heating. The method may include controlling the evaporator pressure regulator to throttle an opening when operating the compressor simultaneously with the electric heater in a dehumidification mode, and controlling the evaporator pressure regulator to fully open when not operating in the dehumidification mode.

As illustrated in the flowchart 300 of FIG. 3, a representative method may monitor vehicle and/or ambient operating conditions as represented by block 310. This may include temperature and relative humidity 312, vehicle climate control settings 314, evaporator fin temperature 316, and evaporator suction pressure 318, for example. The controller then determines an operating mode for the heat pump based on the current conditions as represented at 320. Representative operating modes may include a heating mode, cooling mode, battery conditioning mode, serial dehumidification mode, and parallel dehumidification mode, for example. The controller then controls actuation of various system components as previously described.

When the controller determines to operate the system in a parallel dehumidification mode with simultaneous operation of a cabin heater and evaporator as represented at block 322, the controller controls the position of an evaporator pressure regulator to throttle the refrigerant flow as represented at 324. The EPR may be controlled in response to refrigerant pressure and temperature to inhibit or prevent icing of the evaporator. In one embodiment, the EPR is controlled in response to evaporator suction pressure and/or fin temperature to maintain the evaporator tins above freezing conditions. When the controller operates the system in modes other than the parallel dehumidification mode at 322, the EPR is controlled to a fully open position having a near zero pressure drop as indicated at 326.

As such, various embodiments of a vehicle heat pump system as described herein may provide one or more advantages. For example, incorporating an electronically controllable or smart evaporation pressure regulator having near zero pressure drop when fully open enables operation of the climate control system in a parallel dehumidification mode while allowing higher efficiency and thermal capacity in all other operating modes by not restricting the refrigerant system suction pressure. The control of the EPR according to embodiments of the disclosure facilitates throttling of the refrigerant flow during some conditions or modes while allowing flow with near zero pressure drop during other operating conditions or modes to keep the refrigerant pressure and temperature above the freezing threshold to inhibit or prevent the cabin evaporator from icing.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a refrigerant loop including an electrically operable compressor coupled to a cabin conditioning heat exchanger, an electronically controlled expansion valve, an external air heat exchanger and an evaporator configured to cool cabin air, wherein the evaporator is coupled to an electronically controlled evaporator pressure regulator positioned between the evaporator and the compressor;
a cabin conditioning loop including the cabin conditioning heat exchanger, an electrically operated coolant heater, and a heater core configured to heat the cabin air;
a battery conditioning loop selectively fluidly coupled to the cabin conditioning loop via a fluid control valve, and coupled to the refrigerant loop by a battery heat exchanger; and
a controller configured to operate the electrically operated coolant heater to heat the cabin air simultaneously with the compressor to cool the cabin air to provide a parallel dehumidification mode, and to control the electronically controlled evaporator pressure regulator to throttle refrigerant flow only during the parallel dehumidification mode, and to control the electronically controlled evaporator pressure regulator to a fully open position when not operating in the parallel dehumidification mode.

2. The vehicle of claim 1 further comprising a temperature sensor configured to provide a signal to the controller indicative of temperature of cooling fins of the evaporator, wherein the controller is further configured to control the electronically controlled evaporator pressure regulator in response to the temperature of the cooling fins.

3. The vehicle of claim 2 further comprising a pressure sensor configured to provide a signal to the controller indicative of refrigerant pressure in the evaporator, wherein the controller is further configured to control the electronically controlled evaporator pressure regulator in response to the refrigerant pressure in the evaporator.

4. The vehicle of claim 1 wherein the controller is further configured to operate the fluid control valve to provide heating or cooling of coolant in the battery conditioning loop.

5. The vehicle of claim 1 further comprising a traction battery coupled to the electrically operated coolant heater.

6. The vehicle of claim 5 wherein the traction battery powers the compressor.

* * * * *